July 28, 1959 — H. M. DUSTIN — 2,896,846

TEN-KEY VALUE AND DECIMAL POINT INDEXING MECHANISM

Original Filed March 7, 1952 — 8 Sheets-Sheet 1

INVENTOR
Howard M. Dustin

INVENTOR
Howard M. Dustin

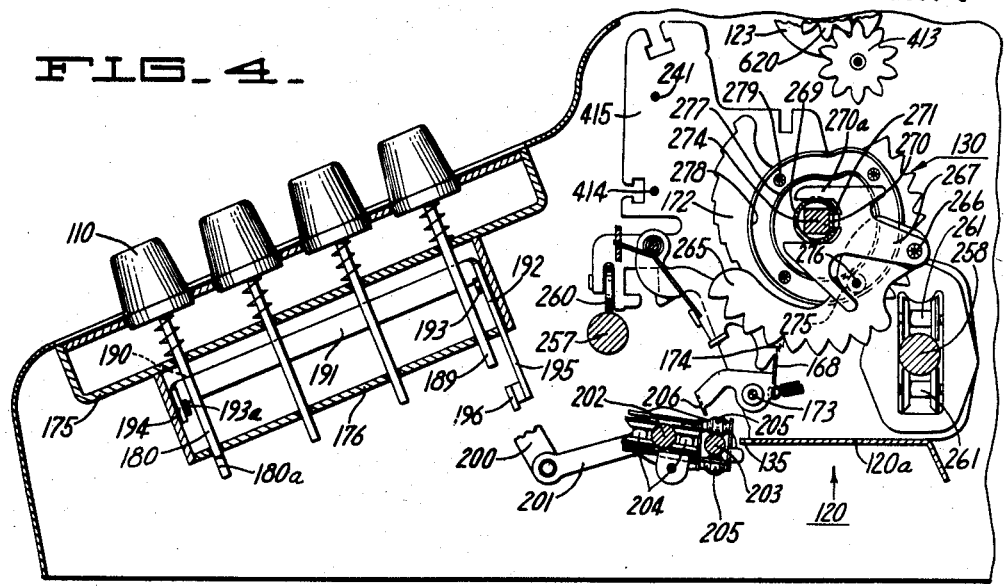

July 28, 1959            H. M. DUSTIN            2,896,846

TEN-KEY VALUE AND DECIMAL POINT INDEXING MECHANISM

Original Filed March 7, 1952            8 Sheets-Sheet 4

INVENTOR

Howard M. Dustin

July 28, 1959        H. M. DUSTIN        2,896,846
TEN-KEY VALUE AND DECIMAL POINT INDEXING MECHANISM
Original Filed March 7, 1952        8 Sheets-Sheet 5

INVENTOR
Howard M. Dustin

July 28, 1959 H. M. DUSTIN 2,896,846
TEN-KEY VALUE AND DECIMAL POINT INDEXING MECHANISM
Original Filed March 7, 1952 8 Sheets-Sheet 7

INVENTOR
Howard M. Dustin

July 28, 1959  H. M. DUSTIN  2,896,846
TEN-KEY VALUE AND DECIMAL POINT INDEXING MECHANISM
Original Filed March 7, 1952  8 Sheets-Sheet 8

INVENTOR
Howard M. Dustin.

United States Patent Office 2,896,846
Patented July 28, 1959

2,896,846

TEN-KEY VALUE AND DECIMAL POINT INDEXING MECHANISM

Howard M. Dustin, Oakland, Calif., assignor to Smith-Corona Marchant Inc., a corporation of New York Original application March 7, 1952, Serial No. 275,259, now Patent No. 2,702,668, dated February 22, 1955. Divided and this application October 11, 1954, Serial No. 461,414

3 Claims. (Cl. 235—145)

The present invention relates to ten key calculating machines and particularly concerns means for shifting a plural order actuator carriage relative to a numeral wheel register.

This invention is a division of the United States Patent No. 2,702,668. The patent discloses and claims a calculating machine which is equipped with a decimal point key adjacent a ten key keyboard, whereby the selected numeral and decimal value of a factor is entered into the machine by depressing the numeral keys and the decimal key in the same sequence that the digits and the decimal point appear on paper. A carriage shift control mechanism is effective during such entry to automatically bring the factor into proper decimal alignment with a previously established result decimal point position in the numeral wheel register without the necessity of "pumping in" zeros.

This is accomplished by maintaining the actuator carriage in the extreme left end position during the entry of the factor digits before the decimal point. A shiftable single order entry device is initially in alignment with the leftmost order of the actuator carriage. Depression of one of the ten value entry keys causes entry of a corresponding value in the leftmost order of the actuator carriage and then causes a one step rightward shift of the entry device into alignment with the next lower order of the actuator. The actuator remains stationary during the step by step shifting movement of the entry device and the consequent setting of each successively lower actuator order until the decimal point key is depressed.

Depression of the decimal point key releases the actuator carriage for shifting movement toward the right, which movement is arrested by a factor and result decimal means, described in detail in said patent, to thereby bring the factor decimal point into alignment with the previously established position of the result decimal. During the shifting movement of the carriage the entry device is carried with it, and after the actuator carriage is brought into proper decimal alignment with the register, the depression of the numeral keys cause entry of the digits after the decimal point in the factor, and control the step by step movement of the entry device incident to the entry of each successive digit. The digits before and after the factor decimal point having thus been entered into the actuator, and the carriage brought to its proper position relative to the result register and its decimal point, the subsequent operation of the machine causes registration of the factor digits in the result register in correct relation to the result decimal point regardless of the variation of the number of digits before or after the decimal point in the factors.

The registration is followed by an automatic return of the carriage and the entry device to their respective left end positions, and then the actuators and the factor decimal point are normalized preparatory to the entry of the next factor.

The shift control mechanism of the present invention is disclosed as embodied in the machine that is driven by a handcrank and therefore motor power is not available for return of the carriage to its initial position against the spring that shifted it to its decimal aligning position.

An object is to provide an improved carriage shifting means.

Another object is to shift a single order value entry device relative to a transversely shiftable actuator carriage regardless of the shifted position of the latter.

Still another object is to return the single order value entry device to its initial position on the storing carriage regardless of the shifted position of the latter.

Other objects and advantages will become apparent from the following detailed description of the invention in which:

Figs. 4 and 5 are right side views, partly in section, showing the numeral keys, the numeral wheel actuator carriage, and a portion of the shift escapement mechanism for the single order value entry device.

GENERAL DESCRIPTION

Figure 1:
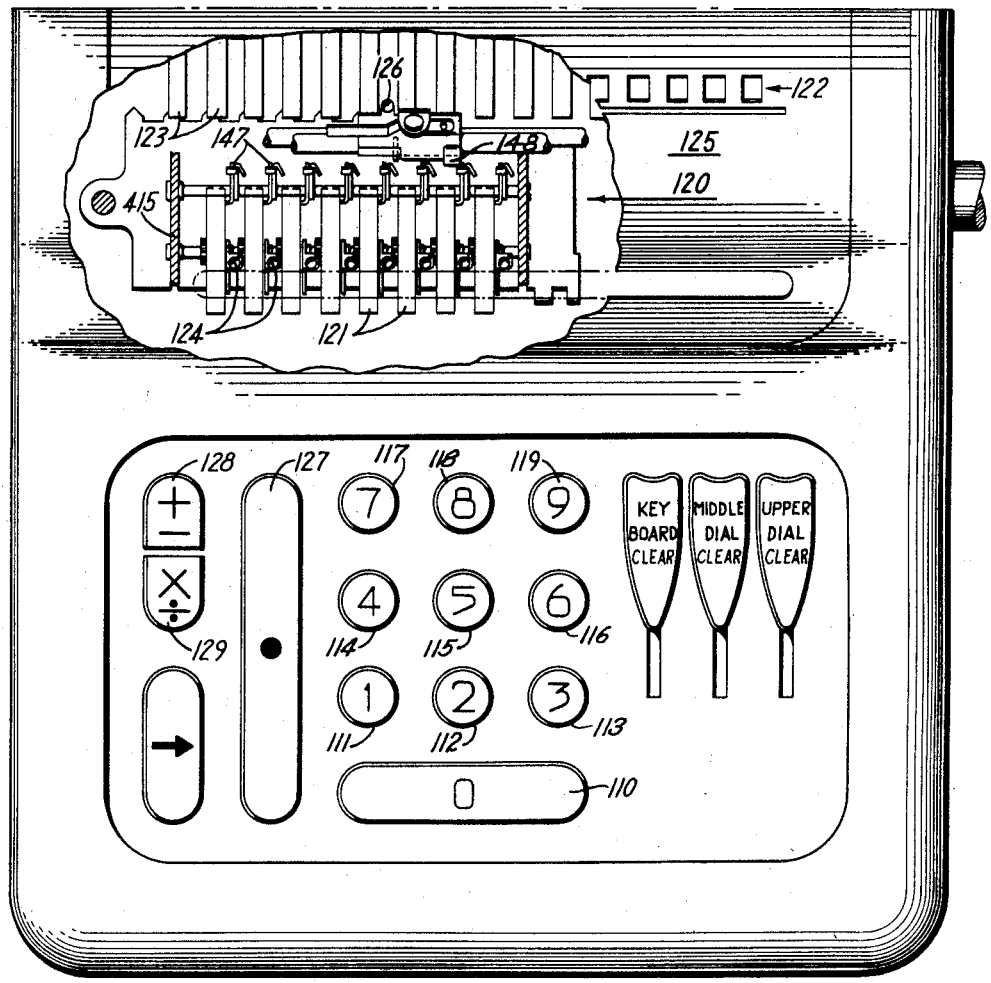
Fig. 1 is an exterior plan view of the machine partly cut away to show the shiftable actuator carriage.

The calculating machine embodying the present invention has ten numeral keys 110–119 (Figs. 1 and 2), the depression of which is effective through the intermediary of the value entry device 136 (Fig. 2) to enter respective values in the various orders of a numeral wheel actuating mechanism. The value entry device 136 includes a setting element 139 and a carrier 137 that is shiftable transversely of the machine and in so doing carries the setting element 139 with it to thereby shift the element from alignment with one order of the actuating mechanism to the next order.

The actuating mechanism is embodied in a carriage that is mounted for transverse shifting movement relative to the accumulator register. The factor indicator numeral wheels 121 (Figs. 1 and 2), which are mounted in the carriage, display the value entered in the actuating mechanism. The numeral wheels 123 (Fig. 1) of the accumulator register 122 are advanced during an actuating operation in accordance with the values previously entered in the ordinal actuators.

A result decimal point indicator 126 for the accumulator register is mounted for sliding movement relative to the various numeral wheels 123 and may be locked in any ordinal position of the register 122. An ordinal decimal point indicator 124 is provided adjacent each factor indicator numeral wheel 121, and each indicator 124 is normally hidden from view beneath the cover 125. Depression of the decimal point key 127 moves a selected factor decimal pointer 124 to a position of display, and also causes the actuator carriage to escape to the right and align the visible decimal 124 of the factor indicator 121 with the single decimal 126 of the register 122.

A plus-minus key 128 is provided to condition the machine for problems of addition and subtraction, while the multiply-divide key 129 conditions the mechanism for performing multiplication and division and for pointing off the decimal in the product and quotient. This latter mechanism is the subject of U.S. Patent No. 2,773,646 by Walter E. Mathi.

Figure 13:
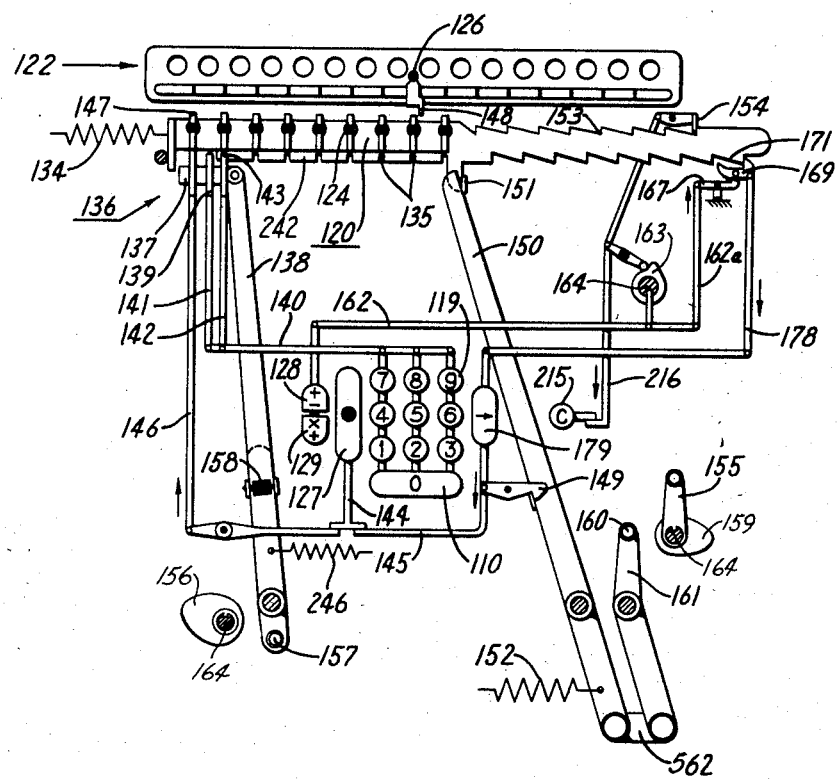
Fig. 13 is a schematic illustration of the invention showing the shifting mechanism and various related control devices.

The general operation of the machine may be better understood by reference to the schematic illustration shown in Fig. 13. The accumulator register is indicated at 122 and the actuator carriage is indicated at 120. The latter is shown in its initial leftmost position to which it is urged by a spring 134. The actuator carriage 120 is provided with a series of ordinal notches 135 which serve as an escapement rack for the carrier 137 and its setting element 139. The carrier is urged to the right by lever 138 and a spring 246, but is normally locked in its initial leftmost position where it is aligned with the leftmost order of the actuator carriage 120.

The carrier 137 supports the setting element 139 which enters values into various orders of the actuating mechanism. Upon depression of keys 110—119, the linkage 140, 141 causes the setting element to adjust the highest (leftmost) order actuator in accordance with the value of the key depressed. Meanwhile, link 142 is reciprocated by the same numeral key depressed and moves an escapement finger 143 back and forth to cause a one order rightward escapement of the carrier 137 and its setting element 139 relative to the actuator carriage 120.

The operator continues to depress the keys 110—119 and enters values in successive orders of the actuating mechanism until the decimal point in the factor is reached. Then the decimal key 127 is depressed which moves links 144, 145 and 146 in the direction of the arrows shown in Fig. 13. Link 146 ejects the one of the stop members 147 with which it is aligned at the time the decimal key is depressed and the normally hidden decimal indicator 124, carried by the ejected stop member, is moved into view. Link 145 moves a latch 149 counterclockwise and releases an actuator carriage shift lever 150 which also may be released by depressing a right shift key 179, as is more fully explained hereinafter. Upon release, the shift lever 150 responds to a spring 152, whereupon the upper extremity of the lever contacts a lug 51 on the actuator carriage and moves the carriage to the right until such movement is stopped by contact of the ejected stop member 147 with a lug 148 of the register decimal carrier 126. At such time the factor decimal indicator 124 is aligned with the decimal indicator 126 for the accumulator register. During the above mentioned shifting movement of the actuator carriage 120, a toothed rack 153 integral therewith moves to the right at which time a pawl 154 yields as it slides over the inclined surface of the teeth 153. At the end of the rightward movement of the rack, the pawl 154 engages a respective tooth of the rack to prevent return movement of the actuator carriage 120.

The carrier 137 moves with the actuator carriage 120 during the rightward shifting movement of the latter and at the end of such movement the keys 110—119 may be again depressed to enter into the actuator the digits following the decimal point of the factor. After the selected value is entered, a hand crank 155 is rotated once in either an additive or subtractive direction to advance the numeral wheels of register 122 in accordance with the values entered into the actuators.

The latter part of the rotation of the hand crank causes restoration of the carrier and the actuator carriage to their respective initial positions, and also resets the factor indicator 121 and the ordinal actuators to their initial blank conditions. During the early part of the hand crank cycle a cam 156 (Fig. 13), driven by the crank, contacts a roller 157 carried by the lever 138 and returns the lever and the carrier 137 to their initial leftmost positions with respect to the actuator carriage. A spring yield 158 is provided in case the carrier is restored before the carriage 120 is fully restored.

The actuator carriage 120 is held in its position of decimal alignment with the numeral wheel register 122 throughout the digital actuating operation by the pawl 154 which engages with rack 153. During this actuating operation, the right shift lever 150 is returned and locked in the initial counterclockwise position shown in Fig. 13 by a mechanism including a cam 159 driven by the handcrank and latch 149. Cam 159 engages a roller 160 carried by a lever 161 and rocks said lever counterclockwise and through a link 562 restores the right shift lever 150 to its initial position in which it is retained by the latch 149. The spring 134 is therefore enabled to return the actuator carriage to its initial leftmost position when the pawl 154 is removed from restraining engagement with rack 153. For this purpose the depression of the plus-minus key 128 is effective through a link 162 to establish a connection between a cam 163 and the hand crank shaft 164. At the same time links 162 and 162a rock a lever 167 clockwise to lower an escapement pawl 169 out of operative relation with an escapement rack 171 fixed to the actuator carriage 120. Then during the latter portion of the hand crank cycle, and after the numeral wheel actuation is completed, the cam 163 withdraws pawl 154 from engagement with rack 153 whereupon spring 134 returns the actuator carriage 120 to its leftmost initial position.

According to the present invention the decimal key 127 is not used in multiplying and dividing operations and all shifting of the actuator carriage is accomplished by depression of a right shift key 179, which is schematically shown in Fig. 13 and described below in greater detail.

When the multiply-divide key 129 is depressed, the plus-minus key is raised thus moving link 162 in such manner as to break the connection between shaft 164 and cam 163, and also to move link 162a and raise the escapement pawl 169 back into operative relation with the rack 171. The disengagement of cam 163 from shaft 164 disables the connection between the hand crank and pawl 154 and the latter therefore remains in position to prevent leftward return shift of the actuator carriage during multicyclic operation of the handcrank in the various orders of the machine.

The raising of the escapement pawl 169 into operative relation with rack 171 enables mechanisms whereby escapement of the actuator carriage to the right may be performed under control of the right shift key 179. Depression of the latter key rocks the latch 149 out of engagement with the shift lever 150 to place the carriage 120 under spring tension for a shift to the right, and through link 178 rocks the pawl 169 clockwise to permit a partial escapement of the carriage 120. Release of the shift key 179 permits pawl 169 to return to its initial position shown whereupon the carriage 120 completes its step of escapement. In this manner the carriage may be shifted one or more orders to the right under the control of key 179. During each such escapement, pawl 154 slides over a respective tooth of the rack 153 and re-engages with the next tooth thereof.

During multiplying operations the multiplicand is entered into the actuator carriage 120 and then the hand crank is turned a number of times corresponding to the value of the highest order multiplier digit, thus entering the product of the multiplicand times this highest multiplier digit into the product register. Then the right shift key 179 is depressed to escape the actuator to the next lower order of the product register and the above described process is repeated in this order. This continues, order by order, until the entire multiplier value has been entered into the machine at which time the product is shown in the product register. The product decimal point 126 is then manually set in accordance with the total number of decimal places in the multiplicand and multiplier factors.

If it is desired to enter the product around a fixed decimal point in the product register, the multiplicand is entered into the actuator carriage by the value keys 110—119 after which the actuator carriage may be shifted under the control of the right shift key 179 one or more orders to the right as required for the particular multiplication problem.

At the conclusion of the multiplying operation the actuator carriage may be returned to its initial position by depressing a clear key 215 which moves link 216 in the direction of the arrow, thus rocking pawl 154 counterclockwise out of engagement with the rack 153. At such time the spring 134 returns the carriage 120 to its leftmost position to prepare the machine for the next calculating operation.

In the following description the reference numerals used in connection with the schematic drawing shown in Fig. 13 will be used whenever possible to designate corresponding parts of the machine structure.

*Value entering mechanism*

The value entering mechanism includes the numeral keys 110—119 (Fig. 2) which act through the intermediary of the value entry device 136 to enter values into the actuator carriage 120, as described in the previously mentioned U.S. Patent No. 2,702,668, to which reference is made for a more comprehensive understanding of the value entering operation. Briefly, the depression of a key 110—119 is effective to perform four principal operations: (1) to move the carrier setting element 139 to the left, as viewed in Fig. 5, by an amount corresponding to the value of the key depressed; (2) to release an ordinal actuator setting arm 166 (Fig. 5) from the restraint of a pawl 168 and cause the arm to be set in a clockwise position under the control of the setting element 139; (3) to lock the arm 166 in its newly set position; and (4) to escape the carrier 137 and the setting element 139 to the next lower order of the actuating mechanism where the value entering operation may be repeated. These four operations are performed by mechanisms described in U.S. Patent No. 2,702,668, and with the exception of the mechanism for escaping the carrier 137 one order to the right of the actuator carriage for each value entered therein, further description of the value entering mechanism is believed unnecessary.

Keys 110—119 (Figs. 2, 3 and 4) have stems such as the stems 180 and 189 for the "0" and "9" keys, respectively, which stems are mounted for up and down sliding movement within respective slots cut in a pair of frame members 175, 176. The keys are spring urged upwardly to the position shown. Each key stem 180—189 has a shoulder 190 (Figs. 3 and 4) which overlies a respective bail 191 of one of three members 192. Each member 192 is in the form of an elongated U that is pivotally mounted on the framework of the machine by a pivot 193 at the rear and pivot 193a at the forward end thereof. The respective rearward lower extremity 195 of each member is pivotally connected to a common link 196 (Fig. 3) which is connected to the value entering device as follows. The leftmost end of link 196, as viewed in Fig. 3, is pivotally connected to a bellcrank 197 which is pivotally mounted on a stud 198 carried by the machine framework. The upper end of bellcrank 197 is pivotally connected to a bent ear 199 on the upper end of a link 200 (Figs. 3 and 4). The lower end of link 200 is pivotally connected to a lever 201 (Fig. 4) fixed to the leftmost end of a transverse shaft 202. The shaft is suitably mounted for rocking movement in bearings on the right and left frame plates of the machine.

From the foregoing description it is seen that depression of a key 110–119 causes the shoulder 190 (Fig. 3) thereof to rock bail 191 counterclockwise, and through link 196, the bellcrank 197, and link 200, to rock the lever 201 (Fig. 4) counterclockwise. A rearward extension of lever 201 carries one end of a shaft 203 which is parallel to shaft 202 and the other end of the shaft 203 is carried by an arm 177 (Fig. 2) fixed to shaft 202. In this manner shaft 203 is maintained in parallel relationship with shaft 202 and is rocked counterclockwise as seen in Figure 4, around shaft 202 when the latter is rocked counterclockwise by depression of any key 110–119.

The carrier 137 is mounted for movement along shafts 202 and 203 by four rollers 204 (Figs. 4, 5 and 11) associated with shaft 202, and also two rollers 205 for shaft 203. The carrier 137 is normally in its leftmost position where the setting element 139 is aligned with the highest order of the actuating mechanism. In this position the uppermost roller 205 (Fig. 4) underlies an ear 206 formed on the highest order pawl 168. The depression of a key 110–119 therefore is effective through the counterclockwise rocking of shaft 203 about the shaft 202 to raise roller 205 into engagement with ear 206 and move the pawl 168 clockwise out of restraining engagement with the value setting arm 166 (Fig. 5).

Meanwhile, the depression of key 110–119 moves the element 139 and the stop pin 165 to the left as seen in Fig. 5 by an amount corresponding to the value of the key depressed, thus permitting the stop arm to rock clockwise a proportionate amount and enter the selected value in the actuator carriage all as is described in the previously mentioned U.S. Patent No. 2,702,668.

Figure 11:
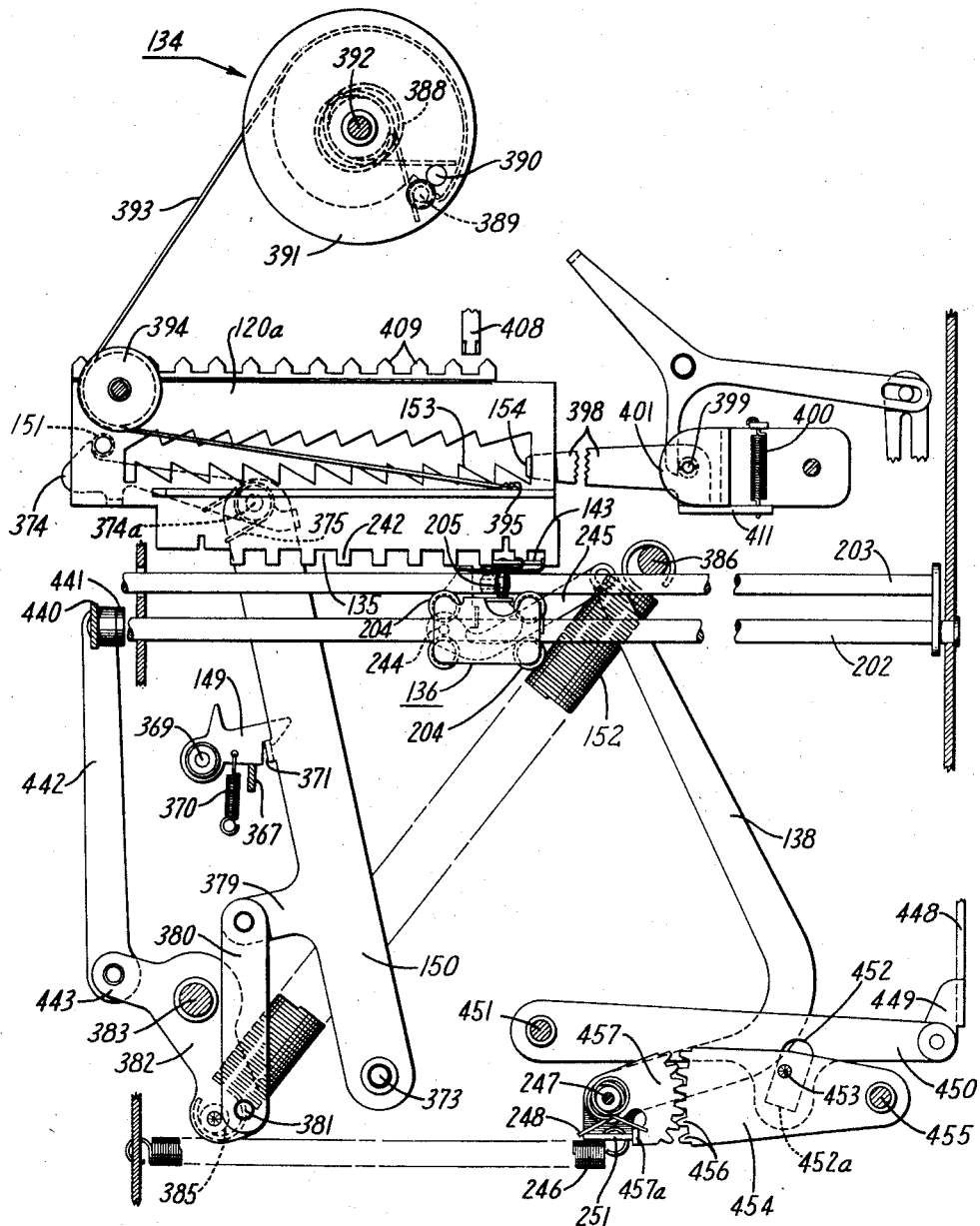
Fig. 11 is a plan view in section of the respective shifting mechanisms for the value entry device and the actuator carriage.

The carrier 137 and its setting element 139 are shifted step by step relative to the actuating mechanism by spring means, and such shifting movement is controlled by an escapement mechanism described below. A stud 244 (Fig. 11) projects downwardly from the carrier 137, and a link 245 is connected to the stud in such a way as to allow pivotal motion of the link upon stud 244 during the shifting of carrier 137 and to also allow the rocking motion of the entry device upon shaft 202 during the value setting operation. The right end of link 245 is pivotally connected to an arm 138 which is freely mounted on stud 247 fixed to the bottom frame of the machine. An upturned ear 251 is formed on a forwardly extending portion of arm 138 as seen in Fig. 11, and a spring 246 is connected between this ear and the machine frame to urge the arm 138 clockwise about its pivot 247, thereby urging the carrier 137 toward the right of the machine.

Figure 2:
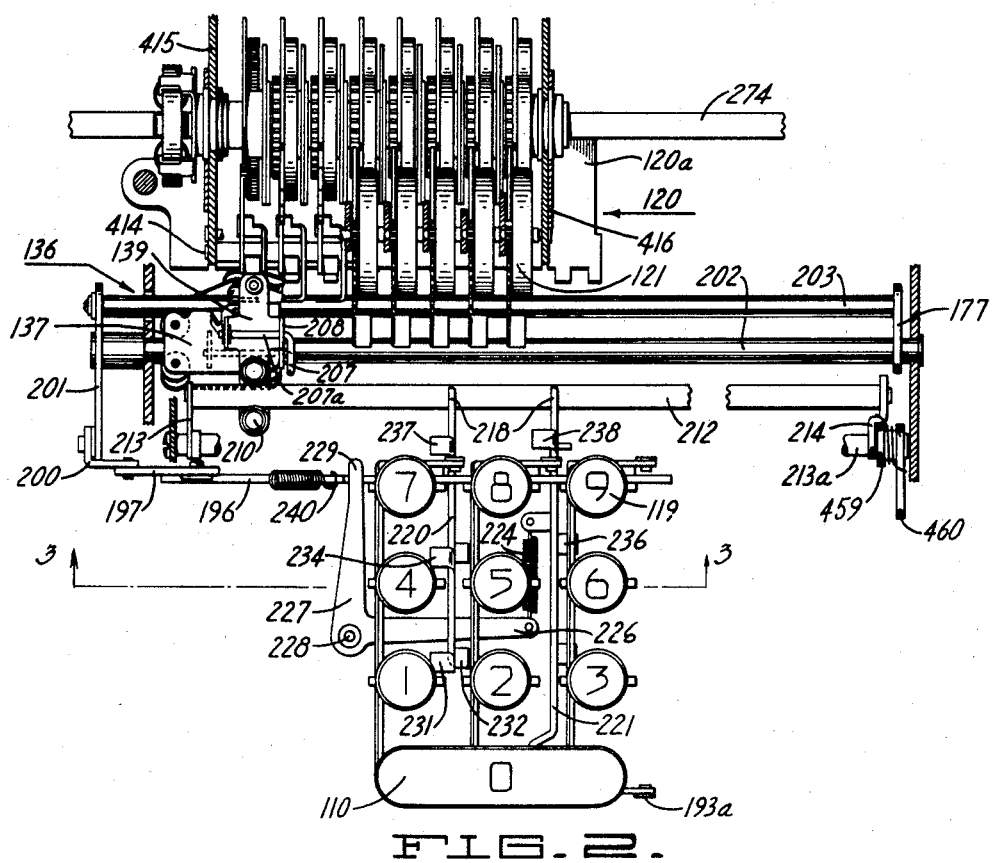
Fig. 2 is a plan view partly in section showing the keyboard, the single order value entry device and the numeral wheel actuator carriage.
Figure 3:
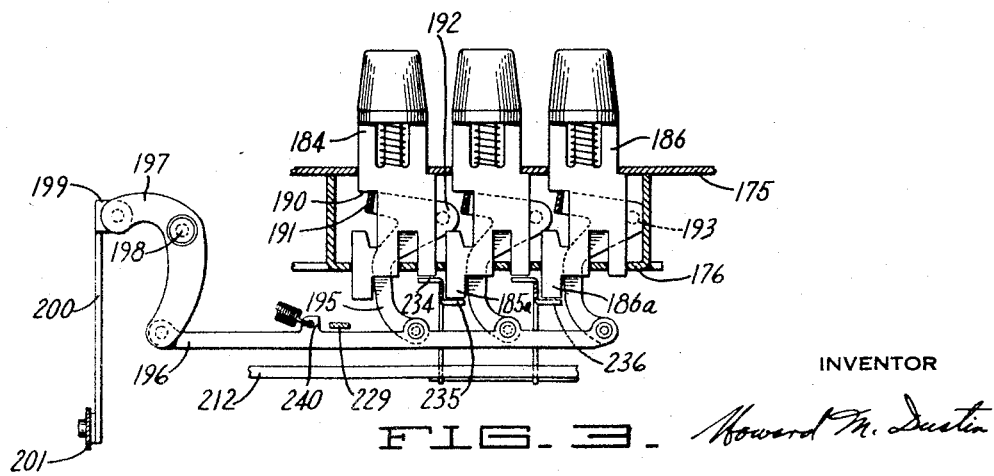
Fig. 3 is a front view partly in section showing three numeral keys and a portion of the shift initiating mechanism for the single order value entry device.

The carrier 137 is initially in its leftmost position shown in Fig. 2, where its setting element 139 is aligned with the leftmost or highest order of the actuating mechanism, and is escaped step by step one order to the right each time a key 110–119 is depressed and released. The depression and release of a key 110–119 effects the reciprocation of the carrier 137 about shaft 202 to permit such escapement under control of the following mechanism. The bottom frame 120a of the actuator carriage 120 (Figs. 4 and 11) has a series of notches 135 corresponding to the ordinal spacing of the actuating mechanism. Cooperating with these notches is a pair of escapement fingers 143 and 143a (Fig. 5). Escapement finger 143 is pivotally mounted for limited movement on a stud, secured to carrier 137, and is urged by spring 243 into contact with finger 143a which, as seen in Fig. 5, is an extension of the carrier. In the initial position shown in Fig. 5, the escapement finger 143 is engaged with a respective notch 135 while finger 143a lies below the plane of the notches. Finger 143a is positioned slightly to the left of that portion of finger 143 which contacts a respective tooth 242 of the escapement rack. When a value entry key is depressed and the carrier 137 is rocked counterclockwise as seen in Figure 5, the finger 143 is lifted out of contact with the tooth and at the same time finger 143a engages the same tooth, thus permitting but a minimum of movement of the carrier. When the depressed key 110–119 is released, the carrier 137 returns clockwise to its initial position at which time the escapement finger 143a is withdrawn from the tooth and escapement finger 143 is brought down on top of the tooth, the spring 243 yielding. As the carrier moves to the right, the escapement finger 143 drops off of the tooth into the next adjacent notch 135 and engages the next ordinal tooth. With this condition of the parts the next key 110–119 may be depressed to enter the next digit into the machine and again shift the carrier and the setting element in the same manner as described above.

The entry of ordinal values into the actuating mechanism and into the indicator dials 121 progresses from left to right in the same manner as one would write the values on paper, and when the decimal point is reached, the decimal key 127 (Fig. 1) is depressed. The depression of key 127 shifts the actuator carriage to the right to a position of decimal alignment with the product decimal point 126 and sets the decimal point to the right of the last digit entered into the indicator 121. Such shifting is controlled jointly by a selective ordinal stop member 147 (Fig. 1) of the indicator 121 and a stop lug 148 of the product register decimal indicator.

The rightmost, or last, member 147 which is so moved is adapted, upon depression of the decimal key and the resulting rightward shifting movement of the actuator carriage, to engage the stop lug 148 of the accumulator register decimal point. Such engagement limits the shifting movement of the carriage to a position of decimal alignment of the actuator with the accumulator register as described in the last mentioned patent. Subsequent operation of the numeral wheel actuators, described in the next section, causes registration of the factor in proper decimal relation to the position of the decimal point in the accumulator register.

*Numeral wheel actuating mechanism*

The actuating mechanism, indicated generally at 130 (Fig. 4), comprises a series of eight ordinal numeral wheel actuators which, upon rotation of a hand crank, advance the numeral wheels 123 (Fig. 1) of the accumulator register 122 according to the values entered into the actuators. The actuators are supported upon the carriage 120 (Fig. 4) which is shiftable relative to the numeral wheels so that selected groups of numeral wheels may be advanced by the actuators.

The actuating mechanism operates on the same principle as the actuating mechanism disclosed in U.S. Patent No. 1,524,924, issued February 3, 1925, but in the present case the actuating mechanism is shiftable and the accumulator register remains in a fixed lateral position in the machine, whereas in the above patent the register is shiftable and the lateral position of the actuators is fixed. In either case the actuators and the numeral wheels are shifted relative to each other to permit the actuator to advance selected groups of numeral wheels.

The carriage 120 (Figs. 2 and 4) which supports the actuating mechanism is mounted for movement on the transverse shafts 257 and 258 (Fig. 4) by means of anti-friction rollers 260 and 261 respectively. The shift mechanism for the actuator carriage is described hereinafter.

*Accumulator register*

The accumulator register 122 (Fig. 1) comprises the numeral wheels 123 which are advanced by the actuating mechanism, mentioned above. A tens carry drum of the type shown in the Patent No. 1,474,230 issued November 13, 1923, is mounted on shaft 304 (Fig. 7) for effecting the tens carry operation. Shaft 304 has gear connection 305, 306 with the hand crank gear 301 so that the tens carry operation is carried out in timed sequence with the digital actuating operation.

*Actuator carriage shift mechanism*

After the digits to the left of the decimal point have been entered into the factor indicator 121 (Fig. 1), the decimal key 127 is depressed to release the actuator carriage for shifting movement to the right until such shifting is stopped by the engagement of the previously mentioned stop 147 (Fig. 1) with the lug 148.

The spring driven mechanism for moving the actuator carriage to a position of decimal alignment includes a shift lever 150 (Fig. 11) which is connected to the actuator carriage and is under spring tension to effect the shifting movement when the decimal key is depressed. The connection between the shift lever 150 and the actuator carriage includes a hook 374 which is freely pivoted at 374a to the upper end of lever 150 and is urged clockwise by a torsion spring 375 into engagement with a roller 151 carried underneath the actuator carriage bottom plate 120a. This arrangement provides for constant engagement between the hook 374 and roller 151 throughout the shifting movement of the carriage.

The shift lever 150 is pivotally mounted on a stud 373 fixed to the bottom frame plate of the machine and has an extension 379 which is pivotally connected to a link 380. The opposite end of link 380 is pivotally connected at 381 to a lever 382, freely mounted on a stud 383 carried by the bottom frame plate of the machine, and which lever 382 is urged counterclockwise by a spring 152 connected at one end to a stud 385 on lever 382 and connected at its opposite end to a stud 386 fixed to the bottom frame plate of the machine. The spring 152 therefore tends to move the shift lever 150 and the actuator carriage 120 toward the right, but such movement normally is prevented by a latch 149 which engages a downwardly bent ear 371 on the shift lever 150. Latch 149 is freely pivoted at 369 and is urged clockwise by a spring 370 into restraining engagement with the ear 371, but may be rocked counterclockwise by the depression of the decimal key 127 to release the shift lever 150.

The decimal key stem 346 (Fig. 6) is guided for up and down movement in slots 175a cut in a keyboard frame plate 175 and also by a fixed stud 348 projecting through a slot 347 in the key stem. A spring 351, attached to the stud 348 and to a stud 352 on the lower end of the key stem normally holds the decimal key 127 in the raised position shown. Stud 352 overlies an arm 365a of a latch release lever 365 pivotally mounted at 366 and having a depending arm 367 (Figs. 6 and 11) lying adjacent latch 149. Depression of the decimal key therefore rocks the lever 365 counterclockwise and through the depending arm 367, moves the latch 149 counterclockwise out of restraining engagement with ear 371. At such time the shift lever 150 is free to move the actuator carriage toward the right.

During rightward shifting of the actuator carriage 120, the value entry device 136 (Fig. 11) and the setting finger 139 (Fig. 5), carrier thereby, are shifted with the actuator carriage since the escapement finger 143 (Fig. 11) of the entry device is engaged with a respective tooth 242 of the escapement rack on the actuator carriage. In this manner the ordinal relationship between the actuator carriage and the entry device is maintained throughout the shifting of the actuator carriage and after such shifting is completed the numeral keys 110–119 may be depressed to enter those values into the actuating mechanism which follow the decimal point.

The previously described rightward escapement of the actuator carriage 120 is powered by the spring 152 (Fig. 11) against the tension of a relatively weaker spring mechanism generally indicated at 134, thereby winding up the latter to provide the power for subsequently returning the actuator carriage to its initial leftmost position. The spring mechanism 134 includes a torsion spring 388, one end of which lies adjacent a stud 389 fixed to the bottom frame plate of the machine and the other end of which spring lies adjacent a stud 390. Stud 390 is carried by a disc 391 freely mounted on a shaft 392 fixed to the bottom frame plate of the machine. Spring 388 urges the stud 390 and the disc 391 clockwise, and through a tape 393, connected at one end to the disc 391 and at 395 to the actuator bottom plate 120a, constantly urges the actuator carriage toward the left. The idler pulley 394 for the tape is freely mounted on a post fixed to the machine framework.

The shift lever 150 is returned and locked in the initial counterclockwise position shown in Fig. 11 during the early part of the hand crank cycle, as described hereinafter, and such return occurs before the actuating cycle is completed. Means including an escapement pawl 398 and a centralizer pawl 408 are therefore provided to prevent the spring mechanism 134 from returning the actuator carriage to its leftmost position until after the actuating cycle is completed. Pawl 398 has an upstanding ear 154 which is adapted to engage with a toothed rack 153 formed on the actuator carriage bottom plate 120a to hold the actuator carriage in any escaped position thereof against the tension of the spring mechanism 134. The pawl 398 is pivotally mounted on a pin 399 and has an extension 411 (Figs. 10 and 11) to which is connected a spring 400 urging the pawl counterclockwise to the position shown in Fig. 11. During shifting of the carriage to the right in response to depression of the decimal key, the teeth of rack 153 exert a camming action on the pawl 398 and move the pawl clockwise out of engagement with successive teeth until such shifting is completed, whereupon the pawl re-engages a respective tooth of the rack.

Figure 10:
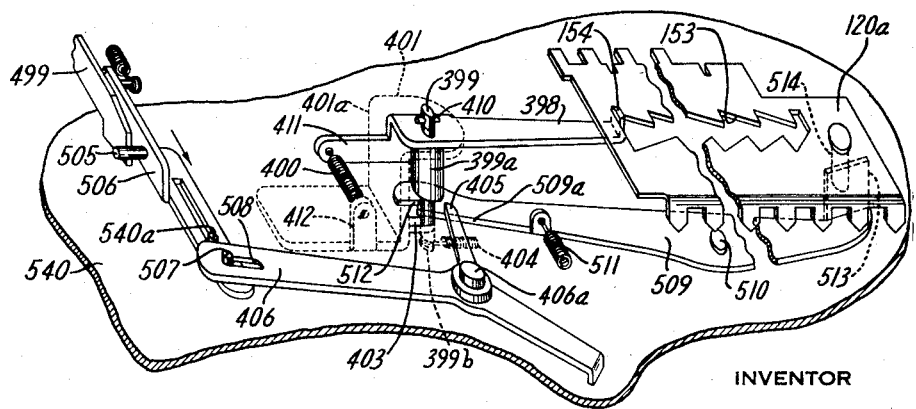
Fig. 10 is an isometric projection as viewed from the right rear of the machine showing the escapement mechanism for the actuator carriage.

The ear 154 of pawl 398 is later moved downwardly out of the plane of the rack 153 to permit the return of the carriage 120 to its leftmost position and for this purpose the pivot pin 399 (Fig. 10) for the pawl 398 is suspended at its upper end from a bracket 401 shown in dotted lines. A keeper pin 410, carried by the pivot pin 399, rests upon the upper portion of the bracket 401, and the lower end 399b of the pin 399 passes through a slot 403 in the bottom plate 540, a spring 404 normally holding the pin in the rightmost end of the slot as seen in Fig. 10. The pawl 398 is mounted on pin 399 and is guided between bracket 401 and an enlarged portion 399a of pin 399 to allow in and out movement of pawl 398 relative to the rack 153 during the previously described shifting of the actuator carriage 120. The bottom depending portion 399b of the pivot pin 399 is moved to the left in the slot 403 and is locked in this position during rotation of the hand crank, as described hereinafter, and such movement of pivot pin 399 causes the top surface of the enlarged portion 399a to move the ear 154 downwardly and out of engagement with the rack 153. This occurs early in the hand crank cycle before numeral wheel actuation is completed, but the centralizer pawl 408, mentioned above, prevents the return of the actuator carriage at this time.

Figure 12:
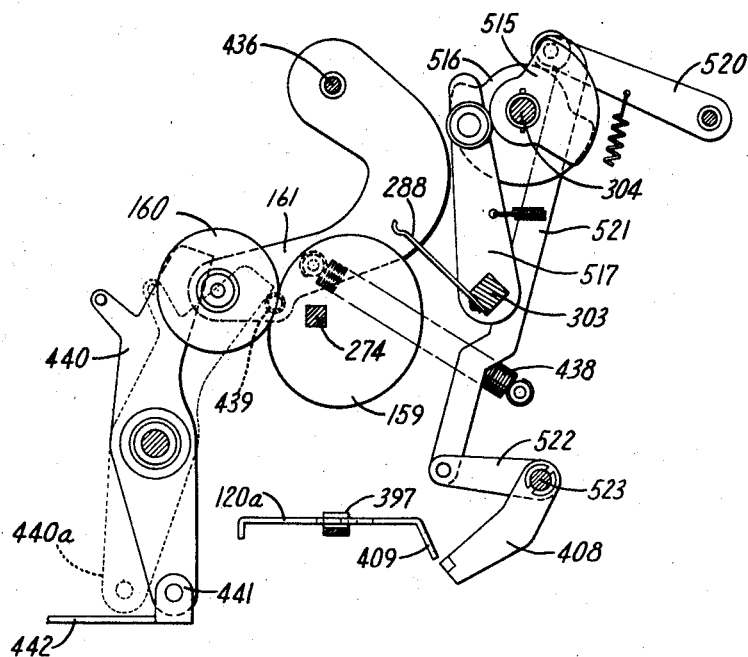
Fig. 12 is a right side view showing respective control cams and associated mechanisms for locking the actuator carriage in any ordinally shifted position and for recocking the return shift mechanism for said carriage.

Early in the cycle of rotation of the hand crank the centralizer pawl 408 (Figs. 11 and 12) is moved, by means described hereinafter, into engagement between respective teeth of ratchet 409 on the actuator carriage bottom plate 120a, and holds the actuator carriage 120 in its shifted position until near the end of the cycle. The escapement pawl 398 (Fig. 11) therefore may be disengaged from the rack 153 any time after the centralizer pawl 408 is engaged with rack 409. In this manner the machine is conditioned to permit the spring mechanism 134 to return the actuator carriage to its leftmost position when the centralizer pawl 408 is withdrawn from engagement with rack 409.

From the foregoing description it is seen that the shifting of the actuator carriage to a position of decimal alignment with the accumulator register is under the control of the decimal key and the respectively set positions of the decimal indicators 126 and 124, and that the return of the carriage to its initial position is under the control of the hand crank.

*Main drive mechanism*

The main drive mechanism comprises the hand crank 155 (Fig. 7), the shaft 302 to which the crank is fixed, and respective gear drives from shaft 302 to shafts 274, 304, 420 and 421.

Shaft 304 is rotatably supported by the left and right side frames of the machine and carries the tens carry actuating mechanism for the accumulator register as previously mentioned. Shafts 420 and 421 carry the digital actuator and the tens carry actuator drums respectively, for a counter register (not shown). Since the present invention is neither concerned with the digital actuator for the counter register nor with the tens carry actuators for the accumulator and counter registers, further mention of the same is believed unnecessary.

The rotation of shaft 304 in either direction by the hand crank rotates a cam 515 (Fig. 12) and causes a follower 517 to rock a transverse shaft 303 and a plurality of ordinal lock pawls 288 (Fig. 5) counterclockwise. The pawls engage the peripheral teeth 172a and lock the selection plates 172 in their selectively set positions to prevent the rotation of the plates during numeral wheel actuation. The lock pawls 288 are returned to their initial clockwise positions slightly before the selection plates are restored to their initial clockwise positions.

Referring now to shaft 274 (Figs. 2,4,5,7,8, and 12) and associated mechanisms, the shaft is driven by the hand crank 155 (Fig. 7) through gears 301 and 300. Shaft 274 carries the ordinal actuators for the accumulator register, and each complete rotation of the hand crank in either direction causes a single cycle of additive or subtractive actuation of the numeral wheels.

Shaft 274 also carries a cam 159 (Fig. 12) which returns the shift lever 150 (Fig. 11) from any shifted position thereof to its initial leftmost position. A follower lever 161 (Fig. 12), freely pivoted at 436 to the machine frame work, carries a roller 160 for contact with the periphery of cam 159 and is urged counterclockwise by a spring 438 to hold the roller 160 against the cam. The follower lever 161 carries a stud 439 which is adapted to cooperate with the upper end of a lever 440 forming a portion of the restore mechanism for the shift lever. Lever 440 may stand in either the initial full line position shown, or in the dotted line position 440a, or in some intermediate position depending on the shifted position of the actuator carriage.

When shaft 274 is rotated in either a clockwise or counterclockwise direction during negative or positive actuation, respectively, the cam 159 moves the follower 161 clockwise and the pin 439 restores lever 440 to the full line position shown. The lower extremity of lever 440 is connected to an upstanding ear 441 on a link 442 (Fig. 11). The other end of link 442 is connected to an arm 443 of the previously mentioned bell crank 382. The counterclockwise movement of lever 440 (Fig. 12) is therefore effective through link 442 (Fig. 11) to restore the bell crank 382 to the initial position shown in Fig. 11. The bell crank 382, in turn, is effective through link 380 to restore the shift lever 150 to its initial leftmost positions whereupon the latch 149 re-engages ear 371 and locks the shift lever 150 in its initial position. At such time spring 152 is tensioned and remains in this condition until the decimal key is again depressed.

The rotation of the hand crank also restores the value entry device 136 (Fig. 11) to its initial leftmost position relative to the actuator carriage rack. For this purpose the previously mentioned gear 300 (Figs. 7 and 8) which is fixed to shaft 274, carries a crank pin 432 (Fig. 8) and the upper end of a link 445 is freely mounted on the crank pin. The lower end of link 445 is pivotally mounted on the upper end of a bell crank 446 pivoted on a stud 447. The lower end of bell crank 446 is connected to a link 448 and the opposite end of the link has an ear 449 (Figs. 8 and 11). A lever 450 (Fig. 11) is pivotally connected to ear 449 and is freely mounted on a stud 451 carried by the bottom frame plate. The crank pin 432 (Fig. 8) is therefore effective through the above linkage to rock the lever 450 (Fig. 11) counterclockwise and this rocking movement is transmitted through mechanism now described to the lever 138 for the entry device 136.

Lever 450 has an aperture 452 which embraces a pin 453 fixed to the bottom of a gear segment 454. The latter is freely mounted on a stud 455 and has gear teeth 456 meshed with a second gear segment 457. Gear segment 457 is freely mounted on stud 247 and has an upstanding ear 457a which normally lies adjacent the ear 251 of the previously mentioned lever 138. A torsion spring 248 urges segment 457 clockwise against the ear 251 so that segment 457 and lever 138 normally act as an integral unit. It will be recalled that during the entry of values into the actuator, the lever 138 and spring 246 urge the value entry device 136 (Fig. 11) to the right and that the carriage is escaped one order toward the right for each ordinal entry made into the actuating mechanism. At the end of such entry the lever 138 therefore stands in a clockwise position such as that shown in Fig. 11, and through the urgency of the torsion spring 248, the segment 457 rotates clockwise with lever 138. The clockwise movement of segment 457, in turn, causes counterclockwise movement of segment 454 and moves the pin 453 counterclockwise a limited amount within the aperture 452.

In Fig. 11, the entry device 136 is shown in its rightmost escaped position relative to the actuator escapement rack 135, and in which position the pin 453 lies in the middle of aperture 452. When the decimal key is depressed and the actuator carriage 120 is shifted toward the right, as previously described, the entry device 136 is shifted further toward the right with the actuator carriage. Such rightward movement of the device 136 causes additional clockwise movement both of lever 138 and the segment 457 and therefore moves segment 454 and pin 453 further counterclockwise from the position shown in Fig. 11.

With the pin 453 lying in any position within the aperture 452, the rotation of crank pin 432 (Fig. 8) and the counterclockwise movement of lever 450 (Fig. 11) causes the lower end 452a of slot 452 to contact the pin 453 and move the pin and the gear segment 454 clockwise. The other segment 457 is therefore rotated counterclockwise, thus tensioning the spring 248 and causing lever 138 to be rocked counterclockwise against the tension of spring 246. This returns the entry device 136 to its initial leftmost position relative to the actuator rack 135. If this position is reached before the lever 450 is moved the full extent provided, then the torsion spring 248 merely yields to permit such movement. In the foregoing description it will be noted that the crank pin 432 (Fig. 8) and associated linkage is the equivalent of the cam 156, schematically shown in Fig. 13.

During the above described return movement of the entry device 136 the spring urged escapement finger 143 (Fig. 5) yields upwardly over the teeth 242 of rack 135. Since the return leftward movement of the entry device 136 also carries the selection finger 139 to the left, means are provided to move the finger 139 to a position (to the left as seen in Fig. 5) in which the stop pin 165 is clear of the value setting arms 166 which are set in various clockwise positions from "0" to "9."

Figure 8:
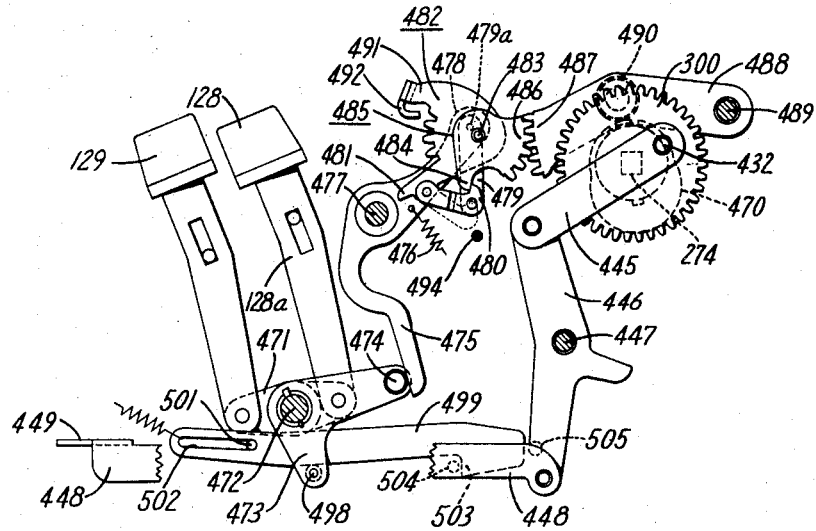
Fig. 8 is a right side view of two keys for enabling and disabling the return shift mechanism for the actuator carriage.
Figure 9:
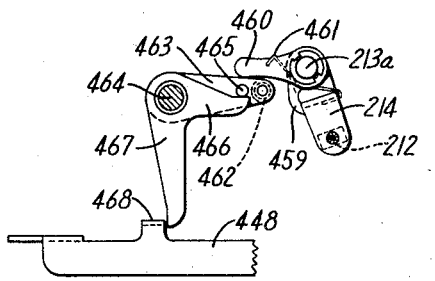
Fig. 9 is a right side view of a portion of the return shift mechanism for the single order value entry device.

This movement of the selection finger 139 is obtained by moving the support rail 212 to the left as viewed in Fig. 5. The rail 212 is supported by a pair of arms 213 and 214 (Figs. 2 and 9) fixed to shaft 213a as previously mentioned. A lever 459 (Fig. 9) lies adjacent the arm 214 and is freely mounted on shaft 213a. A lever 460 is integral with lever 459 and a torsion spring 461 overlies the lever 460 and arm 214 to hold lever 459 against arm 214. Arm 214 and levers 459 and 460 thus act as an integral unit. The leftward end of the lever 460 lies in the plane of a roller 462 fixed on a lever 463 freely mounted on a shaft 464 and carrying a stud 465 which overlies an extension 466 of a bell crank 467 freely mounted on shaft 464. A lower depending portion of bell crank 467 lies adjacent an ear 468 on the previously mentioned link 448 (Fig. 8). The latter is moved toward the right when the hand crank is rotated in either direction, as previously mentioned, at which time ear 468 (Fig. 9) moves bell crank 467 counterclockwise. Such movement causes the extension 466 to move stud 465 and lever 463 counter clockwise and through roller 462 to move lever 460 clockwise. This tensions the spring 461 and causes arm 214 to follow lever 460 in its clockwise movement. In this manner arm 214 moves the rail 212 (Fig. 5) clockwise, thus moving the selection finger 139 to the left out of the path of the adjustment arms 166 after which the entry device 136 is returned to its initial position. During the second half of the hand crank cycle, the link 448 (Fig. 8) is returned to its initial position and the rail 212 is returned to the initial position shown in Fig. 5.

During problems of addition and subtraction the actuator carriage, as previously mentioned, is returned to its initial leftmost position during the latter part of each cycle of operation of the handcrank. For this purpose the handcrank and related mechanisms are effective first, to remove the pawl tooth 154 (Fig. 11) from engagement with the actuator carriage rack 153 and then to remove the centralizer pawl 408 from engagement with rack 409. This releases the actuator carriage to the control of the spring mechanism 134 which then effects the return shifting operation.

The mechanism for withdrawing the tooth 154 from rack 153 includes the previously mentioned link 448 (Fig. 8) which is moved to the right and back by the crank pin 432. Link 448 carries a pin 504 lying adjacent a hook 503 formed on a slide 499. The latter is slidably mounted on a pin 501 and is further supported by a roller 498 carried by a lever 473. The latter and an integral double armed lever 471 are pivotally mounted on a shaft 472. The plus-minus key 128 and the multiply-divide key 129 are pivotally connected to the opposed arms of lever 471. With the lever 473 set in the position shown by the depression of the plus-minus key 128, the roller 498 holds the slide 499 in the position shown so that the rightmost end of the slide lies adjacent a pin 505 (Fig. 10) projecting from a second slide 506. In this manner the link 448 (Fig. 8), the hook slide 499 and the slide 506 (Fig. 10) are connected together and act as an integral unit. Slide 506 has a horizontally formed portion lying flat on the bottom frame plate and guided by a pin 540a projecting from the plate. Slide 506 carries a pin 507 which projects through a slot 508 in a bellcrank 406 pivotally mounted at 406a to the bottom frame plate and having an arm 405 lying adjacent the previously described pin 399. It is evident, therefore, that the rightward movement of link 448 (Fig. 8) together with the slides 499 and 506 causes the bellcrank 406 (Fig. 10) to rock counterclockwise thus moving the pin 399 clockwise. This causes clockwise movement of pawl 398 and removes tooth 154 from restraining engagement with rack 153.

The pawl 398 must be held disabled in its clockwise position until after the centralizer pawl 408 (Fig. 11) is removed from rack 409 to release the actuator carriage for its return movement, and the following mechanism is provided to lock the pawl 398 in its clockwise position until after such return carriage movement is completed.

A latch lever 509 (Fig. 10) is pivotally mounted at 510 on the bottom frame plate of the machine and is urged counterclockwise by a spring 511. A latching notch 512 on the leftmost end of the lever normally lies to the left as seen in Figure 10, of the pin 399 but upon clockwise movement of the pin to withdraw the pawl tooth 154 from rack 153, the pin 399 moves past the notch 512 whereupon the latch lever 509 moves counterclockwise into restraining engagement with the pin. This condition prevails until the actuator carriage is returned to its initial position (to the right in Fig. 10) whereupon a pin 514, projecting beneath the carriage bottom plate 120a wipes along a cam face 513 on the latch lever 509 and moves it clockwise, thus releasing the pin 399 and permitting the tooth 154 to re-engage rack 153 with the actuator carriage in its initial position.

The mechanism for controlling the previously mentioned centralizer pawl 408 includes a cam 516 (Fig. 12) carried by shaft 304. Early in the operating cycle of the machine the cam 516 acts through a follower 520 and a link 521 to rock an arm 522 and the shaft 523 clockwise. The centralizer pawl 408 is fixed to shaft 523 and is adapted, upon clockwise movement of shaft 523 to rock upwardly into engagement with the teeth of the centralizing rack 409 (Fig. 11). At such time the pawl 408 locks the carriage in a respective ordinal position and holds it in this position until near the end of the handcrank cycle when it is withdrawn from the rack. It should be noted that the pawl 408 is rocked to locking position before the shift lever 150 is restored to the initial position shown in Fig. 11 and also before the pawl tooth 154 is withdrawn from engagement with rack 153. The withdrawal of pawl 408 (Fig. 11) from rack 409 is the last function performed by the rotation of the handcrank and permits restoration of the actuator carriage to its initial position by the spring mechanism 134.

In review then, the rotation of the handcrank causes the following operations which are listed below in only approximate timed sequence since some of the operations overlap each other:

(1) Cam 516 (Fig. 12) rocks the centralizer pawl 408 clockwise to lock the actuator carriage in its current shifted position of decimal alignment with the accumulator register.

(2) Cam 515 rocks the pawls 288 (Figs. 5 and 12) counterclockwise to lock the selector plates 172 in their selectively set positions.

(3) Shaft 274 (Fig. 4) and the actuator segments 265 are rotated to advance the numeral wheels of the accumulator register by selected amounts.

(4) Crank pin 432 (Fig. 8) acts through link 445, bellcrank 446, link 448 (Fig. 11), lever 450, pin 453 and gear segments 454 and 457 to move the shift lever 138 counterclockwise and thus restore the value entry device 136 to its initial leftmost position with respect to the actuator carriage rack 135.

(5) Cam 159 (Fig. 12) acts through follower 161, lever 440 (Fig. 11), link 442, bellcrank 382 and link 380 to return the shift lever 150 to its initial leftmost position where it is locked by latch 149.

(6) Crank pin 432 (Fig. 8) acts through link 445, bellcrank 446, link 448, pin 504, link 499, pin 505 (Fig. 10), slide 506, pin 507, and bellcrank 406 to rock the lower portion of pin 399 clockwise and thus withdraw pawl tooth 154 from engagement with rack 153 and in which withdrawn position the pawl is locked by latch lever 509.

(7) Cam 515 (Fig. 12) permits the pawls 288 (Fig. 5) to return to their initial clockwise positions out of engagement with the selector plates 172.

(8) Cam 470 (Fig. 8) restores the ordinal actuators selector plates 172 (Fig. 5) to their initial position, as described in the previously mentioned patent.

(9) Cam 516 (Fig. 12) permits the centralizer pawl 408 to return to the initial position shown and thus release the actuator carriage whereupon the spring mechanism 134 (Fig. 11) returns the actuator carriage 120 to its initial leftmost position.

(10) The return of the actuator carriage per (9) above causes pin 514 (Fig. 10) on the actuator carriage bottom plate 120a to rock latch 509 clockwise and thus release the pin 399 whereupon the pawl tooth 154 re-engages rack 153.

At this time the entire machine is restored to its initial condition with the exception that the accumulator register shows the value entered therein and the counter register shows the item count. The next value to be accumulated may then be entered into the machine by depression of the ten entry keys and the decimal key, as previously described, after which the handcrank is rotated once to advance the numeral wheels of the accumulator register in accordance with the value selected and to restore the machine to a condition in which another value may be entered.

The structural elements represented by the following reference numbers, in the drawings indicated, correspond to like numbered elements in U.S. Patent No. 2,702,668, and are fully described in that patent.

Figure 1. 415.

Figure 2. 414, 415, 416, 177, 208, 207, 207a, 210, 212, 229, 237, 238, 218, 240, 220, 224, 236, 234, 226, 227, 228, 221, 231, 232, 459, and 460.

Figure 3. 234, 185a, 186a, 212, 240, 229, 235, and 236.

Figure 4. 194, 180a, 176, 173, 174, 172, 275, 276, 414, 415, 266, 267, 270, 270a, 271, 278, 277, 279, 269, 241, 620, and 413.

Figure 5. 180a, 222, 223, 220, 221, 219, 224, 225, 226, 270b, 209, 210, 211, 218, 207a, 207, 208, 494, 495, 495a, 496, 169, 170, 286, 285, 241, 284, 492, 428, 414, 283a, 283, 299, 282, 281, 290, 269, 279, 289, and 287.

Figure 6:
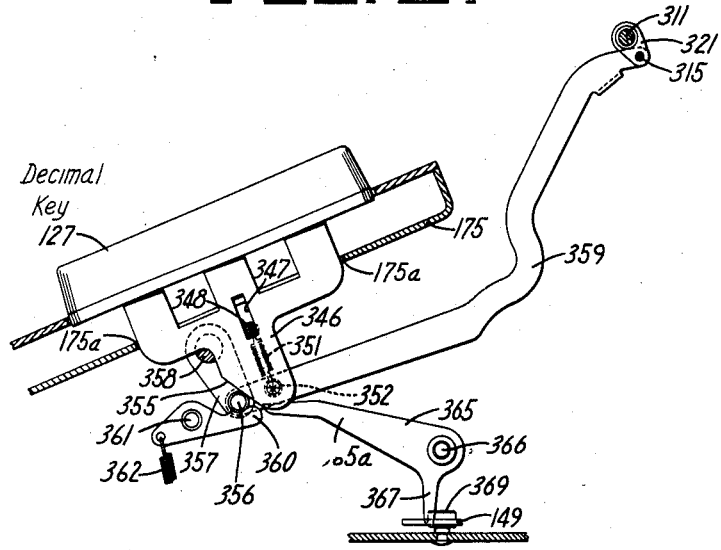
Fig. 6 is a right side view of the decimal point key and related mechanisms.

Figure 6. 311, 315, 321, 359, 360, 356, 357, 355, 358, 361, and 362.

Figure 7:
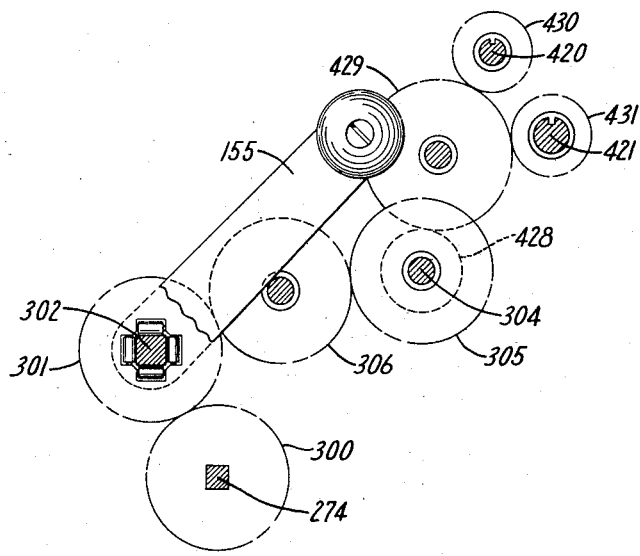
Fig. 7 is a right side view of a drive train from the hand crank to various mechanisms.

Figure 7. 428 and 429.

Figure 8. 128a, 474, 475, 479, 480, 494, 476, 477, 481, 484, 485, 491, 492, 482, 478, 479a, 483, 486, 487, 490, 488, and 489.

Figure 10. 401a, 412, and 509a.

The mechanism for shifting the single order value entry device 136 (Fig. 2) relative to the plural order actuator carriage 120, both before and after depression of the decimal key, together with the mechanism for restoring the value entry device to its initial position relative to the actuator carriage, forms the subject matter of a divisional patent application Serial No. 793,379, filed February 1959.

The invention claimed is:

1. In a calculating machine having a register including numeral wheels and actuators therefor, means operable to ordinally shift the actuators relative to the numeral wheels, a value entry mechanism, a device operable under control of the value entry mechanism to adjust the actuators in accordance with a selected value, means operable by the value entry mechanism to shift the device one order relative to the actuators for each ordinal adjustment of the actuators, and mechanism operable to maintain the shifted position of the device relative to the actuators during the operation of the actuator shift mechanism.

2. A calculating machine according to claim 1 in which the value entry mechanism is operable to shift the device after said shifting movement of the actuators.

3. A calculating machine according to claim 1 including means operable with the actuators in any shifted position thereof to restore the adjusting device to a predetermined position relative to the actuators.

(References on following page)

References Cited in the file of this patent

UNITED STATES PATENTS

| | | |
|---|---|---|
| 2,088,049 | Britten | July 27, 1937 |
| 2,492,345 | Allen | Dec. 27, 1949 |
| 2,560,910 | Toorell et al. | July 17, 1951 |
| 2,645,422 | Pfleger | July 14, 1953 |
| 2,697,552 | Buzzi | Dec. 21, 1954 |
| 2,707,077 | Wise | Apr. 26, 1955 |

FOREIGN PATENTS

| | | |
|---|---|---|
| 620,175 | Great Britain | Mar. 21, 1949 |